United States Patent
Kim et al.

(10) Patent No.: US 11,767,928 B2
(45) Date of Patent: Sep. 26, 2023

(54) SOLENOID VALVE WITH EXPLOSION-PROOF STRUCTURE, FUEL FEEDING SYSTEM, AND METHOD OF MANUFACTURING THE SOLENOID VALVE WITH EXPLOSION-PROOF STRUCTURE

(71) Applicants: HANWHA AEROSPACE CO., LTD., Changwon-si (KR); LUMIR INC., Yongin-si (KR)

(72) Inventors: Young Wan Kim, Changwon-si (KR); Joon Won Lee, Changwon-si (KR); Myeong Ryong Nam, Yongin-si (KR); Min Seock Kim, Yongin-si (KR)

(73) Assignees: HANWHA AEROSPACE CO., LTD., Changwon-wi (KR); LUMIR INC., Yongin-si (KR)

( * ) Notice: Subject to any disclaimer, the term of this patent is extended or adjusted under 35 U.S.C. 154(b) by 0 days.

(21) Appl. No.: 17/673,097

(22) Filed: Feb. 16, 2022

(65) Prior Publication Data

US 2022/0333712 A1 Oct. 20, 2022

(30) Foreign Application Priority Data

Apr. 15, 2021 (KR) .......... 10-2021-0049082

(51) Int. Cl.
*F16K 31/00* (2006.01)
*F16K 31/06* (2006.01)
(Continued)

(52) U.S. Cl.
CPC ........... *F16K 31/0675* (2013.01); *B21K 1/24* (2013.01); *F02M 51/0625* (2013.01); *F16K 31/0655* (2013.01)

(58) Field of Classification Search
CPC ........... F16K 31/0675; F16K 31/0655; F02M 51/0625; B21K 1/24
See application file for complete search history.

(56) References Cited

U.S. PATENT DOCUMENTS 258,500 A * 5/1882 Storer .................. F16K 31/10
                                                          251/282
409,170 A * 8/1889 Wheeler et al. ........ F16K 31/10
                                                          251/282
(Continued)

FOREIGN PATENT DOCUMENTS

DE    2427201 A1    1/1976
EP    0900329 A1    3/1999
(Continued)

OTHER PUBLICATIONS

Extended European Search Report dated Sep. 16, 2022 by the European Patent Office in EP Patent Application No. 22164029.5.

*Primary Examiner* — Phutthiwat Wongwian
*Assistant Examiner* — Sherman D Manley
(74) *Attorney, Agent, or Firm* — Sughrue Mion, PLLC

(57) ABSTRACT

A solenoid valve having an explosion-proof structure, a fuel feeding system, and a method of manufacturing the solenoid valve having an explosion-proof structure are provided. The solenoid valve having an explosion-proof structure includes: a body including a channel through which a fluid flows; a housing connected to the body and having one surface opened; a solenoid assembly arranged inside the housing and electrically connected to a controller; an armature, at least a portion of which is arranged in the channel and which opens or closes the channel by moving relative to the solenoid assembly by a magnetic field generated by the solenoid assembly; and a cover plate arranged on the one surface of the housing to face the armature.

14 Claims, 6 Drawing Sheets

(51) Int. Cl.
*B21K 1/24* (2006.01)
*F02M 51/06* (2006.01)

(56) References Cited

U.S. PATENT DOCUMENTS

| | | | | |
|---|---|---|---|---|
| 2,296,322 | A * | 9/1942 | Alfery | F23N 5/107 137/66 |
| 2,911,183 | A * | 11/1959 | Matthews | F16K 31/0655 251/285 |
| 5,316,113 | A * | 5/1994 | Yamaoka | F16F 9/3484 188/320 |
| 5,785,511 | A * | 7/1998 | Shah | F23N 5/107 431/46 |
| 5,979,484 | A * | 11/1999 | Grando | F23N 5/107 137/66 |
| 7,059,581 | B2 * | 6/2006 | Invernizzi | F23N 1/005 137/870 |
| 10,408,181 | B2 * | 9/2019 | Könczöl | F02M 63/0017 |
| 10,458,506 | B2 * | 10/2019 | Kamakura | F16F 9/50 |
| 10,495,177 | B2 * | 12/2019 | Kamakura | F16F 9/50 |
| 11,156,308 | B2 * | 10/2021 | Hayakawa | F16K 31/10 |
| 11,181,204 | B2 * | 11/2021 | Bonanno | F16K 31/0686 |
| 2010/0300553 | A1 * | 12/2010 | Bertelli | G05D 16/0663 137/487.5 |
| 2013/0099146 | A1 * | 4/2013 | Fukano | F16K 31/0655 251/129.15 |
| 2013/0306891 | A1 * | 11/2013 | Fietz | F16K 47/023 251/120 |
| 2014/0001385 | A1 * | 1/2014 | Scott | F16K 31/0655 251/129.15 |
| 2015/0233487 | A1 * | 8/2015 | Matsumoto | F16K 31/0655 251/129.15 |
| 2016/0169404 | A1 * | 6/2016 | Choi | F16K 31/408 251/129.15 |
| 2018/0313460 | A1 * | 11/2018 | Tsuchizawa | F16K 31/0655 |
| 2019/0049035 | A1 * | 2/2019 | Huang | F16K 31/0655 |
| 2019/0293202 | A1 * | 9/2019 | Murata | F16K 1/46 |
| 2019/0338866 | A1 * | 11/2019 | Fuller | F16K 31/0655 |
| 2020/0025294 | A1 * | 1/2020 | Kimura | F16K 31/0655 |
| 2020/0072378 | A1 * | 3/2020 | Hazzard | F16K 31/408 |
| 2020/0232569 | A1 * | 7/2020 | Ward | F16K 41/10 |
| 2020/0352454 | A1 * | 11/2020 | Sano | A61B 5/02141 |
| 2021/0217548 | A1 * | 7/2021 | Giordano | F16K 1/443 |
| 2021/0319947 | A1 * | 10/2021 | Kim | H01F 27/306 |
| 2022/0154844 | A1 * | 5/2022 | Renollett | F02M 21/0245 |

FOREIGN PATENT DOCUMENTS

| | | |
|---|---|---|
| JP | 2597378 Y2 | 7/1999 |
| JP | 2006258139 A | 9/2006 |
| KR | 10-1756569 B1 | 7/2017 |
| KR | 10-2018-0000059 A | 1/2018 |
| KR | 10-1847176 B1 | 4/2018 |
| KR | 10-2137405 B1 | 7/2020 |
| WO | 97/44580 A1 | 11/1997 |
| WO | 2014/125974 A1 | 8/2014 |
| WO | 2020/158728 A1 | 8/2020 |

\* cited by examiner

SOLENOID VALVE WITH EXPLOSION-PROOF STRUCTURE, FUEL FEEDING SYSTEM, AND METHOD OF MANUFACTURING THE SOLENOID VALVE WITH EXPLOSION-PROOF STRUCTURE

CROSS-REFERENCE TO RELATED APPLICATION

This application is based on and claims priority from Korean Patent Application No. 10-2021-0049082, filed on Apr. 15, 2021, in the Korean Intellectual Property Office, the disclosure of which is incorporated herein in its entirety by reference.

BACKGROUND

1. Field

The present disclosure relate to a solenoid valve, and more particularly, to a solenoid valve including an explosion-proof structure.

2. Description of the Related Art

A solenoid valve generates a magnetic field by flow of an electric current through a coil wound in a cylindrical form, and thus, a fluid flow is controlled by the magnetic field moving a mover. Currently, most electromagnetic valves are solenoid valves, and a fluid flow is controlled by controlling a magnetic field through remote control. Solenoid valves are used in various fields such as hydraulic or pneumatic equipment, mechanical equipment, vehicles, electrical equipment, chemistry, and medicine.

Solenoid valves are also used as gas feeding valves in large-capacity engines for ships. By on/off control of the solenoid valves, gas fuel is fed into a cylinder and explosion is induced to obtain an output. A gas is supplied to engines for ships at a very large gas flow rate, and thus, the performance and safety of solenoid valves used therein are strictly regulated.

Accordingly, gas feeding valves with a classification certification were applicable to large-capacity engines for ships until 2016, however, from January 2017, only gas feeding valves with a certification for use in Zone 0 of hazardous places, received from the International Electrotechnical Commission System for Certification to Standards Relating to Equipment for Use in Explosive Atmospheres (IECEx) for use in Zone 0 of hazardous places are applicable to large-capacity engines for ships.

That is, in order to install a gas feeding valve in a place (Zone 0) where a hazardous atmosphere exists continuously or for a long period of time, the gas feeding valve can be installed only by acquiring Equipment Protection Level (EPL) Ga in an explosive gas atmosphere.

However, due to technical difficulties, a gas feeding valve including a solenoid that satisfies the international explosion-proof certification has not yet been developed, and thus, exception to the relevant regulations is accepted and applied to gas feeding valves that have obtained the existing classification certifications.

The above-mentioned background art is technical information that the inventor possessed to derive the present disclosure or acquired in the process of deriving the present disclosure, and it cannot be said that the background art is necessarily a known technique disclosed to the general public before the filing of the present disclosure.

SUMMARY

One or more embodiments include a solenoid valve including an explosion-proof structure for securing excellent performance and safety compared with a solenoid valve according to the related art.

However, the above-described objective an example, and is not limited thereto.

Additional aspects will be set forth in part in the description which follows and, in part, will be apparent from the description, or may be learned by practice of the presented embodiments of the disclosure.

According to one or more embodiments, a solenoid valve having an explosion-proof structure, includes: a body including a channel through which a fluid flows; a housing connected to the body and having one surface opened; a solenoid assembly arranged inside the housing and electrically connected to a controller; an armature, at least a portion of which is arranged in the channel, and which opens or closes the channel by moving relative to the solenoid assembly by a magnetic field generated by the solenoid assembly; and a cover plate arranged on the one surface of the housing to face the armature.

The at least a portion of the solenoid assembly may be arranged to pass through the cover plate.

The cover plate may be arranged on a same plane as a bottom surface of the solenoid assembly.

The solenoid assembly may include: a core including a mounting portion forming a step with a bottom surface of the solenoid assembly; and a coil wound around the core, wherein the cover plate comprises a slot inserted into the mounting portion.

A thickness of the cover plate may be equal to a depth of the mounting portion.

The core may include a plurality of protrusions, and the mounting portion may be recessed inward along an edge of a bottom surface of the protrusions and forms a step with the bottom surface of the protrusions.

In a state in which the slot of the cover plate is inserted into the mounting portion, the cover plate may be disposed on a same plane as the bottom surface of the protrusions.

In a state in which the cover plate is inserted into the mounting portion, the slot, the mounting portion, and an inner wall of the housing may be welded, and the bottom surface of the solenoid assembly may be polished.

According to one or more embodiments, a fuel feeding system including an engine, a fuel feeding manifold feeding fuel to the engine, an air supply manifold supplying air to the engine, a solenoid valve which opens or closes a space between the fuel feeding manifold and the air supply manifold, and a controller controlling the solenoid valve, is included, wherein the solenoid valve includes: a body including a channel through which a fluid flows; a housing connected to the body and having one surface opened; a solenoid assembly arranged inside the housing and electrically connected to the controller; an armature, at least a portion of which is arranged in the channel, and which opens or closes the channel by moving relative to the solenoid assembly by a magnetic field generated by the solenoid assembly; and a cover plate arranged on the one surface of the housing to face the armature.

According to one or more embodiments, a method of manufacturing a solenoid valve having an explosion-proof structure, includes: fixing a solenoid assembly including a core and a coil in a housing; fixing a cover plate in the housing; mounting the cover plate on the solenoid assembly; welding the housing, the solenoid assembly, and the cover plate; and grinding a surface of the cover plate.

Other aspects, features, and advantages other than those described above will become apparent from the accompanying drawings, the appended claims, and the detailed description of the disclosure.

BRIEF DESCRIPTION OF DRAWINGS

The above and other aspects, features, and advantages of the embodiments of the disclosure will be more apparent from the following description taken in conjunction with the accompanying drawings, in which.

DETAILED DESCRIPTION

Figure 1:
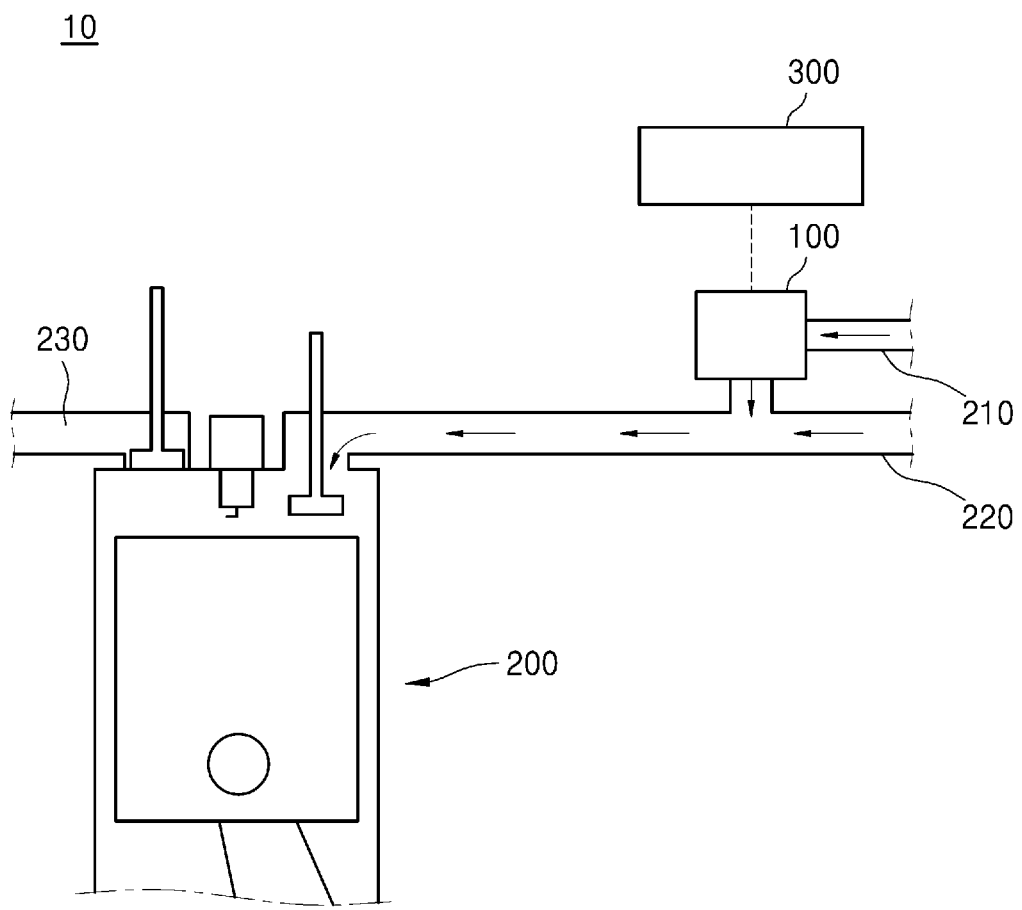
FIG. 1 illustrates a fuel feeding system according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description of the present disclosure, even though illustrated with respect to different embodiments, the same reference numerals are used for the same components.

Hereinafter, embodiments of the present disclosure will be described in detail with reference to the accompanying drawings, and when described with reference to the drawings, the same or corresponding components are given the same reference numerals, and repeated description thereof will be omitted.

It will be understood that although the terms "first", "second", etc. may be used herein to describe various components, these components should not be limited by these terms. These components are only used to distinguish one component from another.

An expression used in the singular form encompasses the expression in the plural form, unless it has a clearly different meaning in the context.

In the present specification, it is to be understood that the terms such as "including" or "having" are intended to indicate the existence of the features or components disclosed in the specification, and are not intended to preclude the possibility that one or more other features or components may be added.

Also, in the drawings, for convenience of description, sizes of elements may be exaggerated or contracted. For example, since sizes and thicknesses of components in the drawings are arbitrarily illustrated for convenience of explanation, the following embodiments are not limited thereto.

In the embodiments below, an x-axis, a y-axis, and a z-axis are not limited to three axes on a rectangular coordinates system but may be construed as including these axes. For example, an-x axis, a y-axis, and a z-axis may be at right angles or may also indicate different directions from one another, which are not at right angles.

When an embodiment is implementable in another manner, a predetermined process order may be different from a described one. For example, two processes that are consecutively described may be substantially simultaneously performed or may be performed in an opposite order to the described order.

The terms used in the present specification are merely used to describe particular embodiments, and are not intended to limit the present disclosure. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 2:
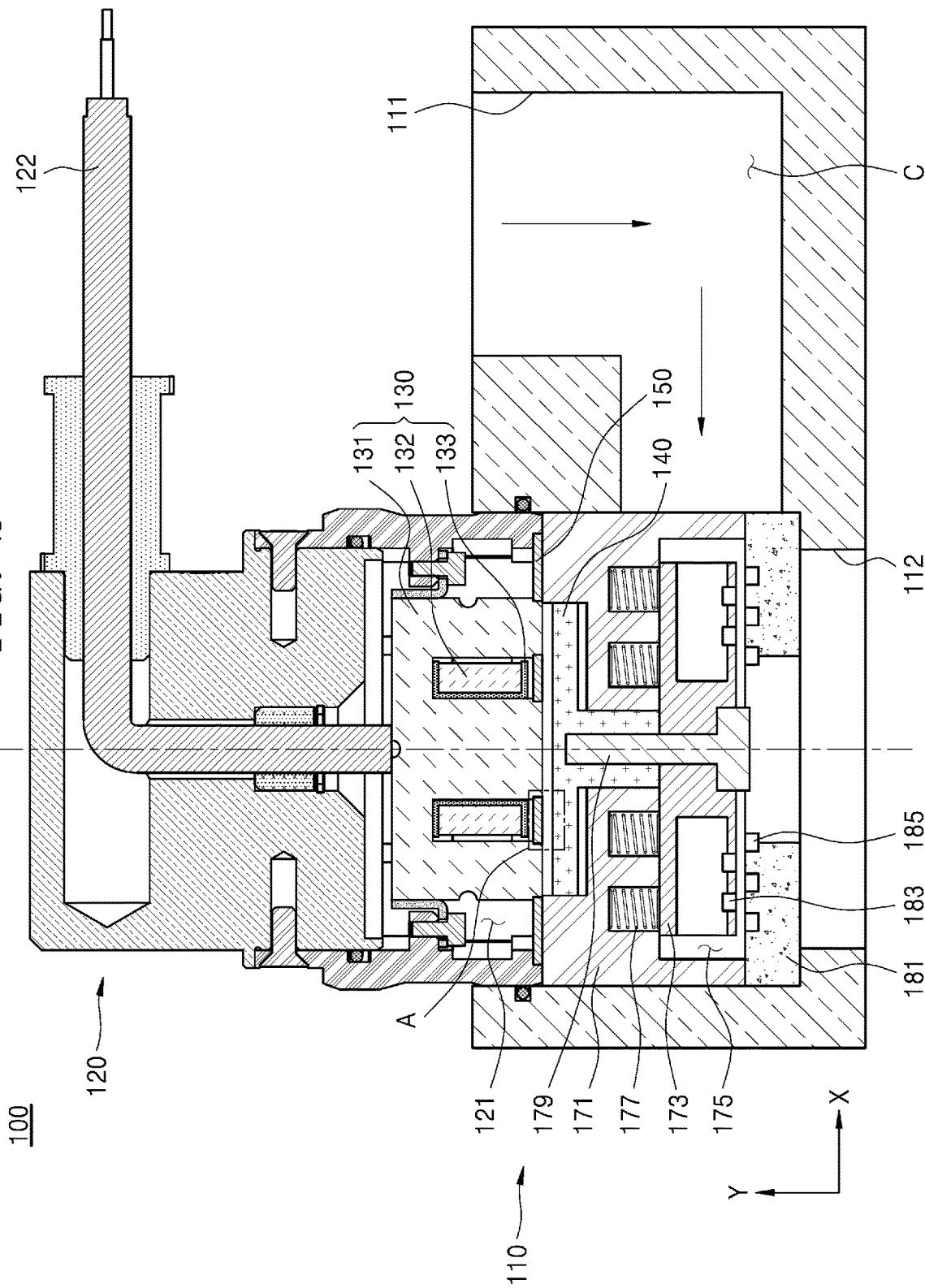
FIGS. 2 and 3 illustrate an operating state of a solenoid valve, according to an embodiment of the present disclosure.
Figure 3:
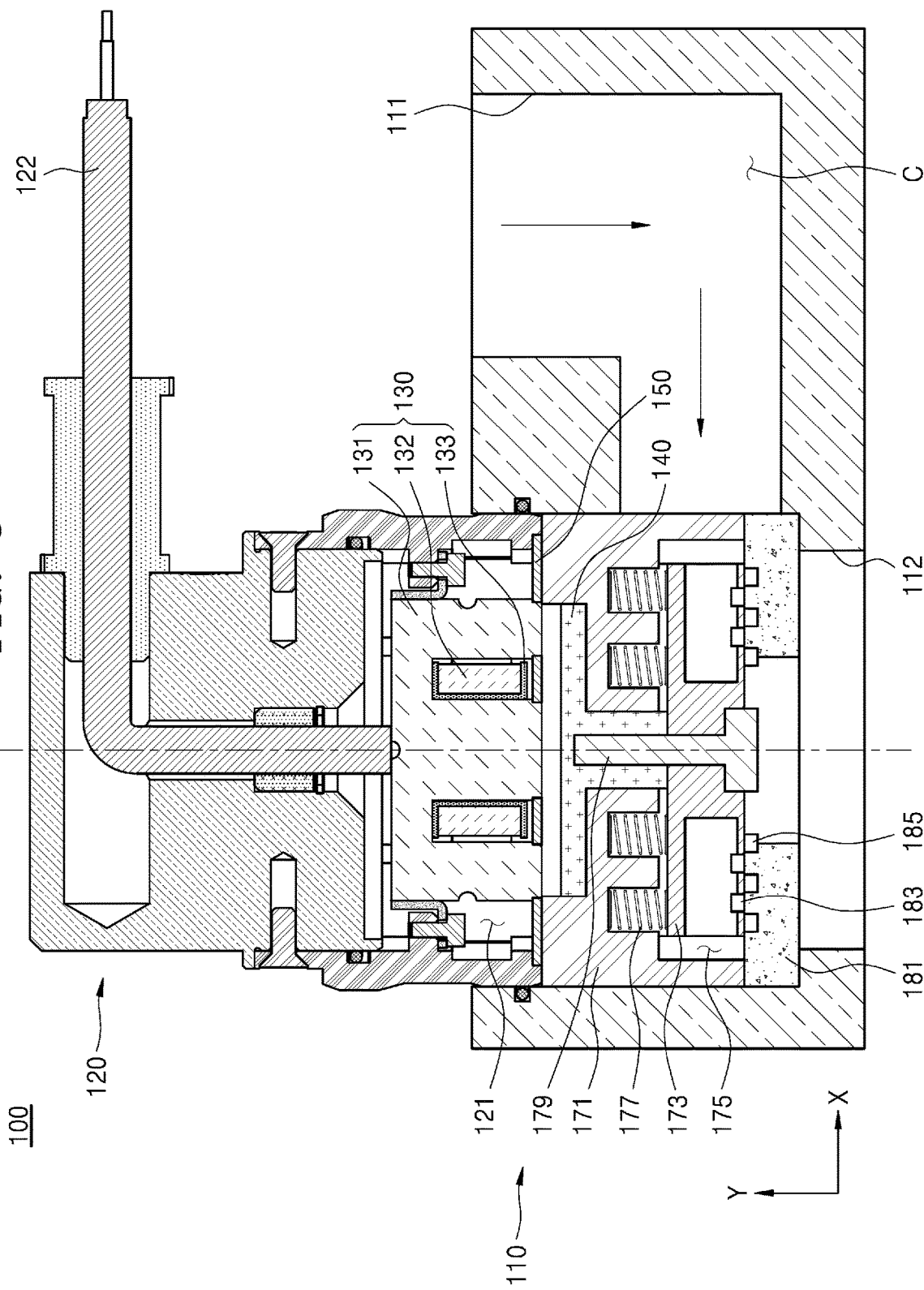
Figure 4:
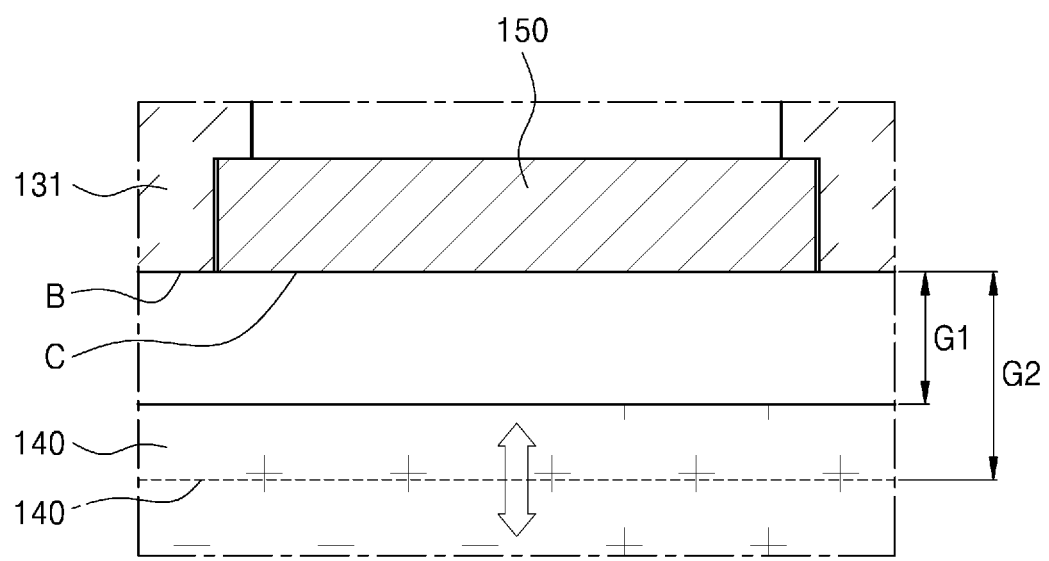
FIG. 4 is an enlarged view of region A of FIG. 2.
Figure 5:
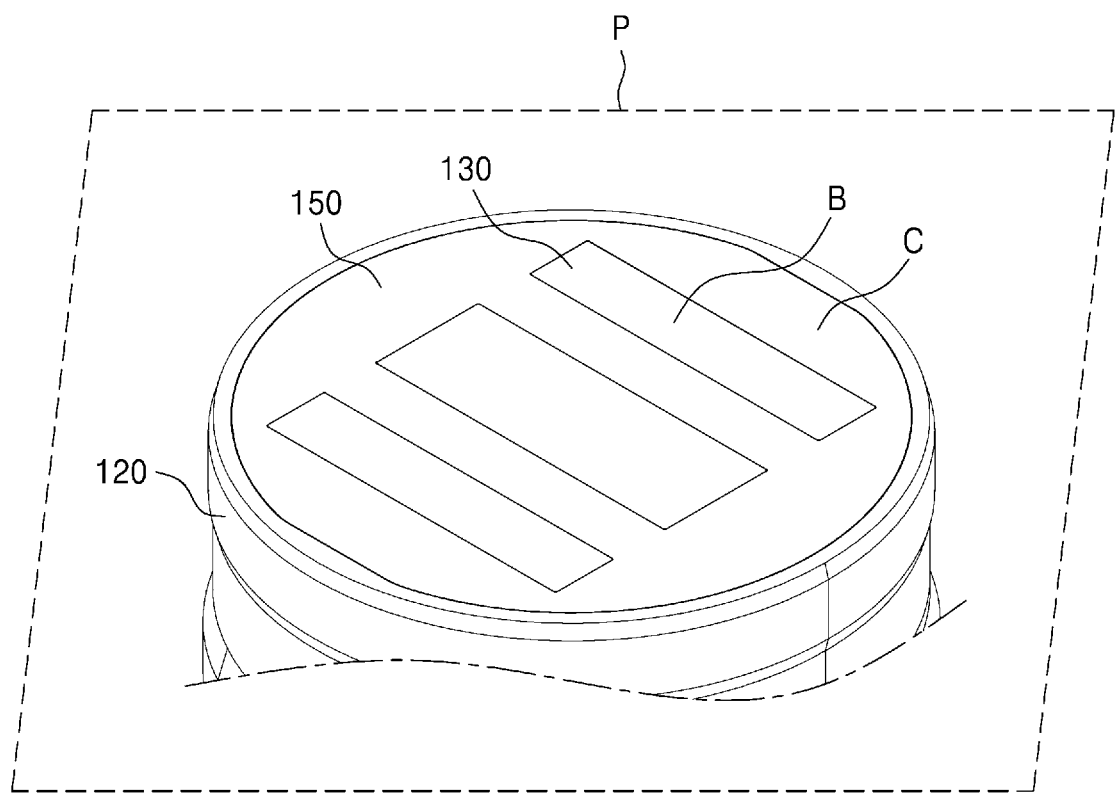
FIG. 5 is an enlarged view of a portion of a solenoid valve, according to an embodiment of the present disclosure.
Figure 5:
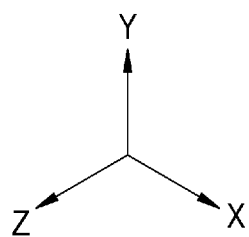
Figure 6:
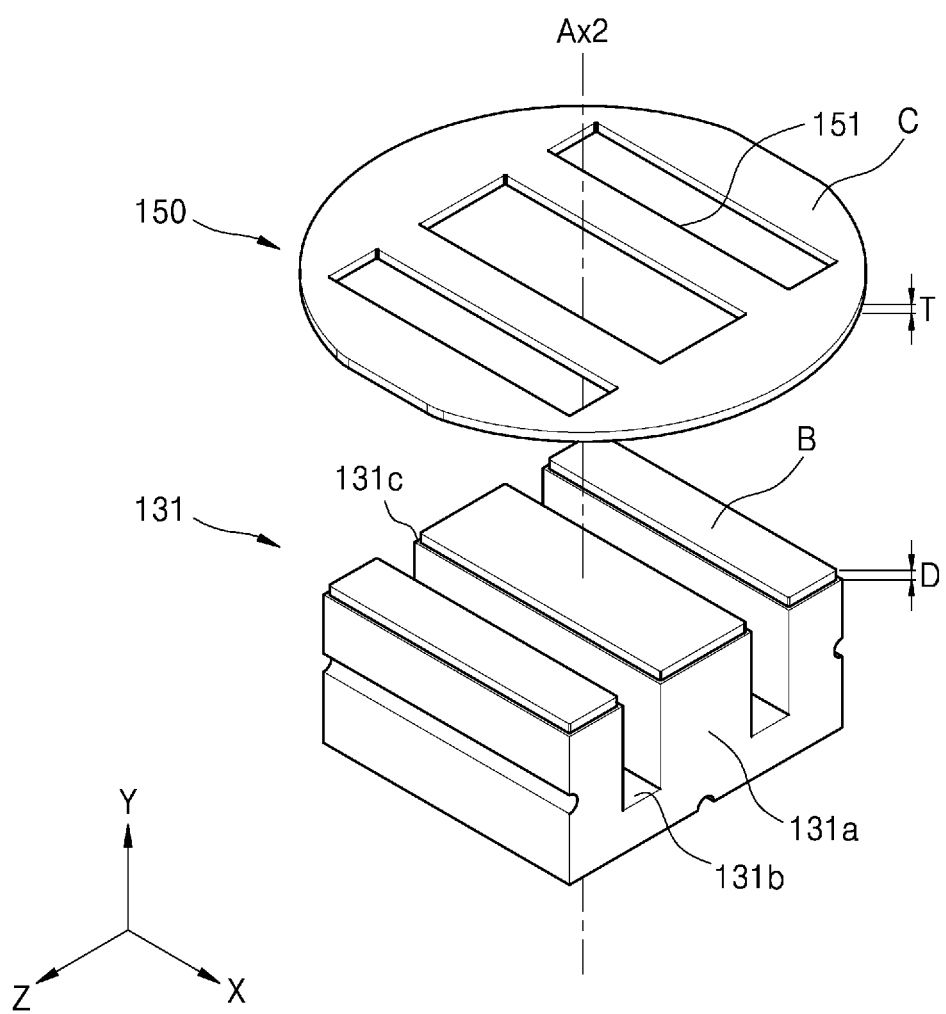
FIG. 6 is an exploded view of a solenoid valve in upside-down form, according to an embodiment of the present disclosure.

FIG. 1 illustrates a fuel feeding system 10 according to an embodiment of the present disclosure. FIGS. 2 and 3 illustrate an operating state of a solenoid valve 100, according to an embodiment of the present disclosure. FIG. 4 is an enlarged view of region A of FIG. 2. FIG. 5 is an enlarged view of a portion of the solenoid valve 100, according to an embodiment of the present disclosure. FIG. 6 is an exploded view of the solenoid valve 100 in upside-down form, according to an embodiment of the present disclosure.

The solenoid valve 100 according to an embodiment of the present disclosure may be included in the fuel feeding system 10. For example, the solenoid valve 100 may be arranged in the fuel feeding system 10 for feeding fuel to an engine for a ship, an aircraft, or a vehicle to control an operation of feeding fuel to the engine.

In an embodiment, the solenoid valve 100 and the fuel feeding system 10 including the same may be used in an explosive gas atmosphere. In detail, the solenoid valve 100 and the fuel feeding system 10 including the same may be used in Zone 0 of hazardous places (places where a hazardous atmosphere exists continuously or for a long period of time, such as inside a container, inside a device and a pipe, etc.) defined by the International Electrotechnical Commission System for Certification to Standards Relating to Equipment for Use in Explosive Atmospheres (IECEx).

Referring to FIG. 1, the fuel feeding system 10 according to an embodiment of the present disclosure may include the solenoid valve 100, an engine 200, and a controller 300.

The solenoid valve 100 may control an output of the engine 200 by controlling a flow rate of fuel fed to the engine 200. In an embodiment, the solenoid valve 100 may be an electronic solenoid valve controlled by the controller 300. The solenoid valve 100 will be described later.

The engine 200 receives fuel and air to generate an output. The type of the engine 200 is not particularly limited, and may be an engine for a ship, an engine for an aircraft, or an engine for a vehicle.

In an embodiment, the engine 200 may include a fuel feeding manifold 210, an air supply manifold 220, and an exhaust manifold 230.

The fuel feeding manifold 210 connects a fuel tank (not shown) to the solenoid valve 100, and feeds fuel fed from the fuel tank to the engine 200. The fuel feeding manifold 210 may be opened and closed according to an operation of the solenoid valve 100.

The air supply manifold 220 receives air from an air tank (not shown) or the outside and supplies the air to the engine 200. FIG. 1 illustrates that the fuel feeding manifold 210 is connected to the air supply manifold 220 after passing through the solenoid valve 100, but is not limited thereto. For example, the fuel feeding manifold 210 and the air supply manifold 220 may not share a flow path with each other.

The exhaust manifold 230 discharges combustion gases of fuel and air to the outside.

The controller 300 is electrically connected to the solenoid valve 100. The controller 300 may adjust an amount of fuel fed to the engine 200 by adjusting opening and closing of the solenoid valve 100 or an opening/closing time of the solenoid valve 100 according to a preset program or in response to receiving a user's instruction. For example, the controller 300 may open or close the fuel feeding manifold 210 by flow of a current to the solenoid assembly 130 of the solenoid valve 100 to form a magnetic field.

Referring to FIGS. 2 to 6, the solenoid valve 100 according to an embodiment of the present disclosure may include a body 110, a housing 120, the solenoid assembly 130, an armature 140, and a cover plate 150.

In the description below, the housing 120 and the solenoid assembly 130 are distinguished from each other to help the understanding of the present disclosure, but the housing 120 and the solenoid assembly 130 may also constitute a single assembly.

The body 110 may include a channel C through which a fluid (for example, fuel or air) moves. For example, as illustrated in FIG. 2, the body 110 may include an inlet 111 connected to the fuel feeding manifold 210 and an outlet 112 connected to a portion where the fuel feeding manifold 210 meets the air supply manifold 220. Accordingly, fuel flowing into the fuel feeding manifold 210 while the solenoid valve 100 is opened, may move along the channel C and then flow into the air supply manifold 220 through the outlet 112.

The housing 120 may be connected to the body 110 and may include an inner space 121. The solenoid assembly 130 to be described later may be arranged in the inner space 121. In an embodiment, the housing 120 may have a central axis Ax1.

In an embodiment, one surface of the housing 120 may be open. For example, as illustrated in FIG. 2, one surface of the housing 120 that is in contact with the inner space 121 may be opened. The one surface may be arranged to face the armature 140 to be described later, and may be covered by the cover plate 150.

In an embodiment, the housing 120 may include a cable 122 connected to the controller 300. The cable 122 may connect the controller 300 to the solenoid assembly 130, and may allow a current to flow through the solenoid assembly 130 to generate a magnetic field.

The solenoid assembly 130 may be arranged in the inner space 121 of the housing 120, and may be electrically connected to the controller 300. For example, as illustrated in FIG. 2, the solenoid assembly 130 may be arranged on the substantially same or the same plane as one end of the housing 120 to face the armature 140 to be described later. That is, a bottom surface B of the solenoid assembly 130 may be arranged on the substantially same or the same plane as the one surface of the housing 120.

In addition, one side of the solenoid assembly 130 may be connected to the cable 122.

In an embodiment, the solenoid assembly 130 may include a core 131 and a coil 132.

The core 131 may be an electromagnet that generates a magnetic force by a magnetic field generated by flowing a current to the coil 132, and may attract or push the armature 140.

In an embodiment, the core 131 may include a mounting portion 131c which forms a step with respect to the bottom surface B of the solenoid assembly 130. For example, as illustrated in FIG. 6, the core 131 may include a plurality of protrusions 131a and a plurality of concave portions 131b arranged between the protrusions 131a. In addition, the mounting portion 131c may be recessed inward along an edge of a bottom surface B of the protrusion 131a, which may be the bottom surface B of the solenoid assembly 130) to form a step with respect to the bottom surface B of the protrusion 131a. Accordingly, a slot 151 of the cover plate 150 to be described later may be inserted into the mounting portion 131c.

While three protrusions 131a having different areas from each other and two concave portions 131b therebetween are illustrated in the drawings, the number, shape, and size of the protrusions 131a and the concave portions 131b, or the like are not limited.

The coil 132 may be wound around an insulator 133 and inserted into the core 131, and may generate a magnetic field when a current is applied thereto. For example, the coil 132 wound around the insulator 133 may be wound around at least one of the plurality of protrusions 131a and inserted into the concave portion 131b.

The armature 140 may be at least partially arranged in the channel C of the body 110. In an embodiment, the armature 140 may be arranged coaxially with the central axis Ax1.

The armature 140 may be a member formed of a metal magnetic material, and when the solenoid assembly 130 generates a magnetic field, the armature 140 may move relative to the solenoid assembly 130 according to the magnetic field to open and close the channel C. This will be described later.

The cover plate 150 may be arranged to face the armature 140 to close one surface of the housing 120, and may expose at least a portion of the solenoid assembly 130. For example, as illustrated in FIGS. 2 and 6, the cover plate 150 may be arranged to be in contact with an inner wall of the housing 120 to cover an opened surface of the housing 120. In addition, at least a portion of the solenoid assembly 130 may be arranged to pass through the cover plate 150.

FIG. 6 illustrates the cover plate 150 in the form of a circular plate, but the cover plate 150 is not limited thereto, and may have an appropriate shape according to the housing 120.

In an embodiment, the cover plate 150 may share a central axis Ax2 with the solenoid assembly 130 (core 131). Here, the central axis Ax2 may be coaxial with the central axis Ax1.

In an embodiment, the cover plate 150 may include the slot 151. For example, as illustrated in FIGS. 5 and 6, the slot 151 is formed in one side of the cover plate 150 and may have a shape corresponding to the mounting portion 131c of the core 131. Accordingly, when the cover plate 150 is mounted on the solenoid assembly 130, a portion of the protrusion 131a of the core 131, for example, the bottom surface B thereof may be exposed to the outside through the slot 151, and the other portions of the core 131 may be covered by the cover plate 150.

According to this configuration, a gap between the bottom surface B of the solenoid assembly 130 and an upper surface of the armature 140 may be minimized, and thus, the strength of a magnetic force exerted by the solenoid assembly 130 on the armature 140 may be secured at a certain level or above.

Although three slots 151 having different areas from each other are illustrated in FIGS. 5 and 6, the number, area, and shape thereof are not particularly limited, and may correspond to the shape of the core 131.

In an embodiment, a thickness T of the cover plate 150 may be equal to a depth D of the mounting portion 131c. Accordingly, as illustrated in FIG. 5, in a state in which the slot 151 is inserted into the mounting portion 131c, the cover plate 150 may be disposed on the same plane P as the bottom surface B of the solenoid assembly 130 (the bottom surface B of the protrusion 131a). According to an embodiment, when the cover plate 150 is disposed on the same plane P as the bottom surface B of the solenoid assembly 130, a bottom surface C of the cover plate 150 may be disposed on the same plane as the bottom surface B of the solenoid assembly 130. Here, the plane P may be a plane parallel to a XZ plane.

Therefore, when the cover plate does not have a slot, a gap between the solenoid assembly and the armature increases by the thickness of the cover plate, and as the gap increases, the magnetic force decreases. However, according to the solenoid valve 100 according to an embodiment of the present disclosure, the core 131 may be exposed to the outside through the slot 151, and the gap between a bottom surface of the core 131 and the armature 140 may be minimized to thereby use the magnetic force generated in the solenoid assembly 130 as much as possible and allow the solenoid valve 100 to operate easily. Here, the bottom surface of the core 131 may refer to the bottom surface B of the protrusion 131a and the bottom surface B of the solenoid assembly 130 in the present embodiment.

In an embodiment, an air gap may be arranged between the solenoid assembly 130 and the cover plate 150.

Next, an operation of the solenoid valve 100 according to an embodiment of the present disclosure will be described with reference to FIGS. 2 and 3.

FIG. 2 illustrates a state in which the channel (C) is open. First, when a current flows through the solenoid assembly 130 by the controller 300, the armature 140 is pulled toward the solenoid assembly 130 by a magnetic field formed by the solenoid assembly 130. Accordingly, the bottom surface of the solenoid assembly 130 and the upper surface of the armature 140 may be spaced apart by a gap G1.

Here, a fixing plate 171 may be arranged inside the body 110 to face one end of the housing 120, and the armature 140 is connected to a movable plate 173 by a coupling member 179. Accordingly, when the armature 140 moves toward the solenoid assembly 130, the movable plate 173 is also moved upwardly, and a gap is formed between the movable plate 173 and an exhaust plate 181. Accordingly, fuel introduced into a chamber 175 through the fuel feeding manifold 210 passes through a clearance between the movable plate 173 and the exhaust plate 181 to flow into the air supply manifold 220 through the outlet 112.

However, a manner in which fuel moves to the air supply manifold 220 is not limited. For example, the movable plate 173 may include a plurality of first holes 183, and the exhaust plate 181 may include a plurality of second holes 185. Also, the exhaust plate 181 may include an exhaust hole (not shown) connected to the air supply manifold 220.

As illustrated in FIG. 2, in the solenoid valve 100 according to an embodiment of the present disclosure, at least a portion of the solenoid assembly 130 is arranged to pass through the cover plate 150. That is, in a state in which the cover plate 150 is mounted on the solenoid assembly 130, the bottom surface of the core 131 may be exposed to the outside through the slot 151, and the bottom surface of the core 131 may be disposed on the same plane as the cover plate 150. Accordingly, the gap G1 between the core 131 and the armature 140 may be minimized, thereby increasing a magnetic force between the solenoid assembly 130 and the armature 140.

Next, FIG. 3 illustrates a state in which the channel C is closed. When no current flows in the solenoid assembly 130 by the controller 300, the magnetic field that pulls the armature 140 disappears, and the armature 140 may move downwards by an elastic member 177. Accordingly, the bottom surface of the solenoid assembly 130 and the upper surface of the armature 140 may be spaced apart by a gap G2.

Here, the elastic member 177 inserted into the fixed plate 171 is compressed while the armature 140 is moved upward, and is expanded when the magnetic field disappears and may press the movable plate 173 downward to thereby quickly move the movable plate 173. Accordingly, a lower surface of the movable plate 173 may be closely adhered to the exhaust plate 181 to thereby close the channel C.

In an embodiment, the slot 151, the mounting portion 131c, and the inner wall of the housing 120 may be welded to one another in a state in which the cover plate 150 is inserted into the mounting portion 131c. In detail, in a state in which the slot 151 of the cover plate 150 is mounted on the mounting portion 131c of the core 131, the mounting portion 131c and the slot 151 are welded to each other, and an outer circumferential surface of the cover plate 150 and the inner wall of the housing 120 may be welded to each other to firmly attach the cover plate 150 and maintain airtightness.

In an embodiment, a surface of the cover plate 150 may be ground in a state in which the cover plate 150 is mounted on the mounting portion 131c. Accordingly, fine irregularities on surfaces of the cover plate 150 and the core 131 may be removed, a step generated during a mounting process may be reduced, and welding beads generated during a welding process may be removed. Thus, a step difference between an outer surface of the cover plate 150 and the bottom surface of the protrusion 131a may be minimized, and ultimately, the cover plate 150 and the bottom surface of the protrusion 131a may be disposed on the same plane.

According to this configuration of the solenoid valve 100 a pressure-resistant explosion-proof structure may be implemented by covering a surface of the housing 120 with the cover plate 150, without filling an additional explosion-proof member such as epoxy into the housing 120.

In addition, according to the solenoid valve 100 in the present embodiment of the present disclosure, the bottom surface of the solenoid assembly 130 and the cover plate 150 of the solenoid assembly 130 may be arranged on the same plane, thereby minimizing a gap between the solenoid assembly 130 and the armature 140. Accordingly, by increasing a magnetic force exerted by the solenoid assembly 130 and the armature 140 to each other, the solenoid valve 100 may be smoothly operated.

Next, a method of manufacturing the solenoid valve 100 according to an embodiment of the present disclosure will be described.

The method of manufacturing the solenoid valve 100 according to an embodiment of the present disclosure may include: fixing the solenoid assembly 130 including the core 131 and the coil 132 in the housing 120; fixing the cover plate 150 in the housing 120; mounting the cover plate 150 on the solenoid assembly 130; welding the housing 120, the solenoid assembly 130, and the cover plate 150; and grinding a surface of the cover plate 150.

First, the solenoid assembly 130 is fixed in the housing 120. The core 131 of the solenoid assembly 130 may be formed by stacking a plurality of core members and integrating the core members by welding into a single core 131.

A method of fixing the solenoid assembly 130 to the housing 120 is not limited. For example, an outer surface of the solenoid assembly 130 and an inner surface of the housing 120 may be connected to each other by using a fixing member illustrated in FIG. 2 (reference numeral not shown).

Next, the slot 151 of the cover plate 150 is mounted on the mounting portion 131c of the core 131. Accordingly, the opened one surface of the housing 120 is closed, and the bottom surface of the core 131 may be exposed through the slot 151. That is, the bottom surface of the core 131 may be arranged through the cover plate 150.

Next, the housing 120, the solenoid assembly 130, and the cover plate 150 are welded. For example, the inner wall of the housing 120 and the outer circumferential surface of the cover plate 150 may be welded to each other, and the mounting portion 131c and the slot 151 may be welded to each other. Accordingly, the cover plate 150 may be firmly mounted to the housing 120 and air tightness may be maintained.

According to an embodiment, a welding method used when integrating the core 131 or welding the cover plate 150 is not particularly limited, and any of various welding methods such as arc welding, gas welding, laser welding, friction welding, cold pressing, etc. may be used.

Then the cover plate 150 is ground. The surface of the cover plate 150 may have irregularities that are difficult to observe with the naked eye. In addition, there may be welding beads generated during a welding process or a step between the surface of the cover plate 150 and the bottom surface of the protrusion 131a. Accordingly, by grinding the surface of the cover plate 150, the cover plate 150 and the bottom surface of the solenoid assembly 130 may be disposed on the same plane.

According to the present disclosure, by covering one surface of the housing 120 with the cover plate 150, a pressure-resistant explosion-proof structure may be implemented without filling an additional explosion-proof member such as epoxy inside the housing 120. That is, even when a gas flows into the housing 120 and a spark or the like is generated inside the housing 120 to cause a flame or explosion, the cover plate 150 may block the flame from spreading to the outside, thereby implementing an explosion-proof structure.

According to the present disclosure, by locating the bottom surface of the solenoid assembly 130 and the cover plate 150 on the same plane as each other, a gap between the solenoid assembly 130 and the armature 140 may be minimized. Accordingly, by increasing the magnetic force exerted by the solenoid assembly 130 and the armature 140 to each other, the solenoid valve 100 may operate smoothly.

According to the present disclosure, a pressure-resistant explosion-proof structure may be implemented by covering a surface of the housing with a cover plate, without filling an additional explosion-proof member such as epoxy in the housing.

According to the present disclosure, by locating the bottom surface of the solenoid assembly and the cover plate on the same plane as each other, a gap between the solenoid assembly and the armature may be minimized. Accordingly, by increasing the magnetic force exerted by the solenoid assembly and the armature to each other, the solenoid valve may operate smoothly.

Specific technical content described in the embodiment is an embodiment and does not limit the technical scope of the embodiment. In order to concisely and clearly describe the description of the present disclosure, descriptions of conventional general techniques and configurations may be omitted. In addition, the connection or connection member of the lines between the components shown in the drawings illustratively shows functional connections and/or physical or circuit connections, and in an actual device, various functional connections, physical connections that are replaceable or additional It may be expressed as a connection, or circuit connections. In addition, unless there is a specific reference such as "essential" or "importantly", it may not be a necessary component for the application of the present disclosure.

The use of the terms "a" and "an" and "the" and similar referents in the detailed description and the claims are to be construed to cover both the singular and the plural, unless specifically defined otherwise. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The embodiments are not limited to the above-described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to those skilled in this art without departing from the spirit and scope of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A solenoid valve comprising:
   a body comprising a channel through which a fluid is configured to flow;
   a housing connected to the body and having one surface opened;
   a solenoid assembly arranged inside the housing;

an armature, at least a portion of which is arranged in the channel, and which is configured to open or close the channel by moving relative to the solenoid assembly by a magnetic field generated by the solenoid assembly; and a cover plate arranged on the one surface of the housing to face the armature, wherein the solenoid assembly comprises a coil and a core, wherein the coil is wound around an insulator and inserted into the core, wherein the cover plate is arranged to cover the coil and to expose the core, and wherein the cover plate is arranged on a same plane as a bottom surface of the core such that the bottom surface of the core and the armature are kept in non-contact state.

2. The solenoid valve of claim 1, wherein the at least a portion of the solenoid assembly is arranged to pass through the cover plate.

3. The solenoid valve of claim 1, wherein the one surface of the housing facing the armature is arranged on the same plane as the bottom surface of the solenoid assembly.

4. The solenoid valve of claim 1, wherein
the core comprises a mounting portion forming a step with a bottom surface of the solenoid assembly; and
wherein the coil is wound around the core,
wherein the cover plate comprises a slot inserted into the mounting portion.

5. The solenoid valve of claim 4, wherein a thickness of the cover plate is equal to a depth of the mounting portion.

6. The solenoid valve of claim 4, wherein the core comprises a plurality of protrusions, and
wherein the mounting portion is recessed inward along an edge of a bottom surface of the plurality of protrusions and forms a step with the bottom surface of the plurality of protrusions.

7. The solenoid valve of claim 6, wherein, in a state in which the slot of the cover plate is inserted into the mounting portion, the cover plate is disposed on a same plane as the bottom surface of the plurality of protrusions.

8. The solenoid valve of claim 4, wherein, in a state in which the cover plate is inserted into the mounting portion, the slot, the mounting portion, and an inner wall of the housing are welded to one another, and the bottom surface of the solenoid assembly is polished.

9. A fuel feeding system comprising an engine, a fuel feeding manifold configured to feed fuel to the engine, an air supply manifold configured to supply air to the engine, a solenoid valve configured to open or close a space between the fuel feeding manifold and the air supply manifold, and a controller configured to control the solenoid valve, wherein the solenoid valve comprises:

a body comprising a channel through which a fluid flows;
a housing connected to the body and having one surface opened;
a solenoid assembly arranged inside the housing and electrically connected to the controller;
an armature of which at least a portion is arranged in the channel, and which is configured to open or close the channel by moving relative to the solenoid assembly by a magnetic field generated by the solenoid assembly; and
a cover plate arranged on the one surface of the housing to face the armature, wherein the solenoid assembly comprises a coil and a core, wherein the coil is wound around an insulator and inserted into the core, and wherein the cover plate is arranged to cover the coil and to expose the core, and wherein the cover plate is arranged on a same plane as a bottom surface of the core such that the bottom surface of the core and the armature are kept on a non-contact state.

10. A method of manufacturing a solenoid valve, the method comprising:
fixing a solenoid assembly comprising a core and a coil in a housing;
fixing a cover plate in the housing;
mounting the cover plate on the solenoid assembly;
welding the housing, the solenoid assembly, and the cover plate; and
grinding a surface of the cover plate,
wherein the coil is wound around an insulator and inserted into the core,
wherein the cover plate is arranged to cover the coil and to expose the core, and
wherein the cover plate is arranged on a same plane as a bottom surface of the core such that the bottom surface of the core and an armature are kept in non-contact state, the armature configured to open or close a channel by moving relative to the solenoid assembly by a magnetic field generated by the solenoid assembly.

11. A solenoid valve comprising:
a solenoid assembly configured to be arranged inside a housing comprising a channel for flowing a fluid;
an armature configured to open or close the channel by moving relative to the solenoid assembly; and
a cover plate combined with the solenoid assembly and facing the armature with a predetermined gap,
wherein a bottom surface of the solenoid assembly facing the armature is coplanar a bottom surface of with the cover plate facing the armature,
wherein the solenoid assembly comprises a coil and a core,
wherein the coil is wound around an insulator and inserted into the core,
wherein the cover plate is arranged to cover the coil and to expose the core, and
wherein the cover plate is arranged on a same plane as a bottom surface of the core such that the bottom surface of the core and the armature are kept in non-contact state.

12. The solenoid valve of claim 11, wherein the cover plate is configured to block a flame generated by the fuel inside housing, and
wherein a bottom surface of the housing is substantially coplanar with the bottom surface of the solenoid assembly.

13. The solenoid valve of claim 12, wherein the core is wound by the coil, and
wherein a bottom surface of the core is coplanar with a bottom surface of the cover plate.

14. The solenoid valve of claim 13, wherein a bottom portion of the core is inserted in a slot formed in the cover plate so that the bottom surface of the core is coplanar with the bottom surface of the cover plate.

* * * * *